United States Patent
Arnold et al.

(10) Patent No.: US 11,039,363 B2
(45) Date of Patent: Jun. 15, 2021

(54) METHOD FOR CONTROLLING RADIO ACCESS RESOURCES IN A COMMUNICATION NETWORK

(71) Applicant: Deutsche Telekom AG, Bonn (DE)

(72) Inventors: Paul Arnold, Frankfurt am Main (DE); Jakob Belschner, Frankfurt (DE); Gerhard Kadel, Darmstadt (DE)

(73) Assignee: DEUTSCHE TELEKOM AG, Bonn (DE)

(*) Notice: Subject to any disclaimer, the term of this patent is extended or adjusted under 35 U.S.C. 154(b) by 95 days.

(21) Appl. No.: 16/091,526

(22) PCT Filed: Mar. 14, 2017

(86) PCT No.: PCT/EP2017/056040
§ 371 (c)(1),
(2) Date: Oct. 5, 2018

(87) PCT Pub. No.: WO2017/174306
PCT Pub. Date: Oct. 12, 2017

(65) Prior Publication Data
US 2019/0132781 A1 May 2, 2019

(30) Foreign Application Priority Data
Apr. 6, 2016 (EP) .................... 16164063

(51) Int. Cl.
*H04W 36/30* (2009.01)
*H04W 72/08* (2009.01)
(Continued)

(52) U.S. Cl.
CPC .......... *H04W 36/30* (2013.01); *G06F 9/5077* (2013.01); *H04W 28/16* (2013.01); *H04W 28/20* (2013.01);
(Continued)

(58) Field of Classification Search
None
See application file for complete search history.

(56) References Cited

U.S. PATENT DOCUMENTS

2007/0156804 A1 7/2007 Mo
2007/0237078 A1* 10/2007 Hundscheidt ....... H04L 12/5692
370/235
(Continued)

FOREIGN PATENT DOCUMENTS

EP 2320608 A1 5/2011

*Primary Examiner* — Ajit Patel
*Assistant Examiner* — Pamit Kaur
(74) *Attorney, Agent, or Firm* — Leydig, Voit & Mayer, Ltd.

(57) ABSTRACT

A communication network comprises a plurality of subnetworks including a first subnetwork and a second subnetwork. Each subnetwork is assigned at least one predefined Quality of Service class according to at least one Service Level Agreement. The Quality of Service classes of the subnetworks are managed by a central Quality of Service manager. The communication network further comprises a radio access network with a plurality of radio access entities. A method for controlling radio access resources in the communication network includes: transmitting, by the central Quality of Service manager, information relating to a Quality of Service class of the first subnetwork to a first radio access entity for radio access to the first subnetwork.

13 Claims, 6 Drawing Sheets

(51) Int. Cl.

| | |
|---|---|
| *G06F 9/50* | (2006.01) |
| *H04W 28/16* | (2009.01) |
| *H04W 28/20* | (2009.01) |
| *H04W 28/24* | (2009.01) |
| *H04W 28/26* | (2009.01) |
| *H04W 36/04* | (2009.01) |
| *H04W 36/08* | (2009.01) |
| *H04W 36/22* | (2009.01) |
| *H04W 72/04* | (2009.01) |

(52) U.S. Cl.
CPC ........... *H04W 28/24* (2013.01); *H04W 28/26* (2013.01); *H04W 36/04* (2013.01); *H04W 36/08* (2013.01); *H04W 36/22* (2013.01); *H04W 72/0446* (2013.01); *H04W 72/087* (2013.01); *H04W 72/04* (2013.01)

(56) References Cited

U.S. PATENT DOCUMENTS

| | | | |
|---|---|---|---|
| 2011/0125905 A1 | 5/2011 | Baucke et al. | |
| 2012/0219014 A1* | 8/2012 | Glaeser | H04L 47/10 370/468 |
| 2013/0215758 A1 | 8/2013 | Logan et al. | |
| 2013/0303114 A1* | 11/2013 | Ahmad | H04M 15/49 455/406 |
| 2016/0353465 A1* | 12/2016 | Vrzic | H04W 12/06 |
| 2017/0086118 A1* | 3/2017 | Vrzic | H04W 36/26 |

\* cited by examiner

METHOD FOR CONTROLLING RADIO ACCESS RESOURCES IN A COMMUNICATION NETWORK

CROSS-REFERENCE TO RELATED APPLICATIONS

This application is a U.S. National Phase application under 35 U.S.C. § 371 of International Application No. PCT/EP2017/056040, filed on Mar. 14, 2017, and claims benefit to European Patent Application No. EP 16164063.6, filed on Apr. 6, 2016. The International Application was published in German on Oct. 12, 2017 as WO 2017/174306 A1 under PCT Article 21(2).

FIELD

The present invention relates to the control of radio access resources in a communication network comprising separate subnetworks, for example slices of a 5G communication network.

BACKGROUND

In modern communication networks, the Quality of Service is an important factor in assessing the performance of a communication technology. In Long-Term Evolution (LTE) communication systems, the Quality of Service is described within the framework of the 3GPP standard. According to 3GPP14-23203, the Quality of Service is defined on a user-specific basis as a function of Quality of Service parameters such as throughput, latency, bit error rate. These Quality of Service parameters are used for example in a base station, such as Evolved Node B (eNodeB) in an LTE network, to determine for example the scheduling of the data of a user, while ensuring the required Quality of Service.

However, the subsequent generations of mobile technologies, for example the fifth generation of mobile technology (5G), modify the classical network architecture in favour of heterogeneous subnetworks, so-called slices, which are logically separated from one another. In particular, in 5G, different radio access technologies can be used for communication via the slices.

SUMMARY

In an exemplary embodiment, the present invention provides a method for controlling radio access resources in a communication network. The communication network comprises a plurality of subnetworks including a first subnetwork and a second subnetwork. Each subnetwork is assigned at least one predefined Quality of Service class according to at least one Service Level Agreement. The Quality of Service classes of the subnetworks are managed by a central Quality of Service manager. The communication network further comprises a radio access network with a plurality of radio access entities. The method includes: transmitting, by the central Quality of Service manager, information relating to a Quality of Service class of the first subnetwork to a first radio access entity for radio access to the first subnetwork.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
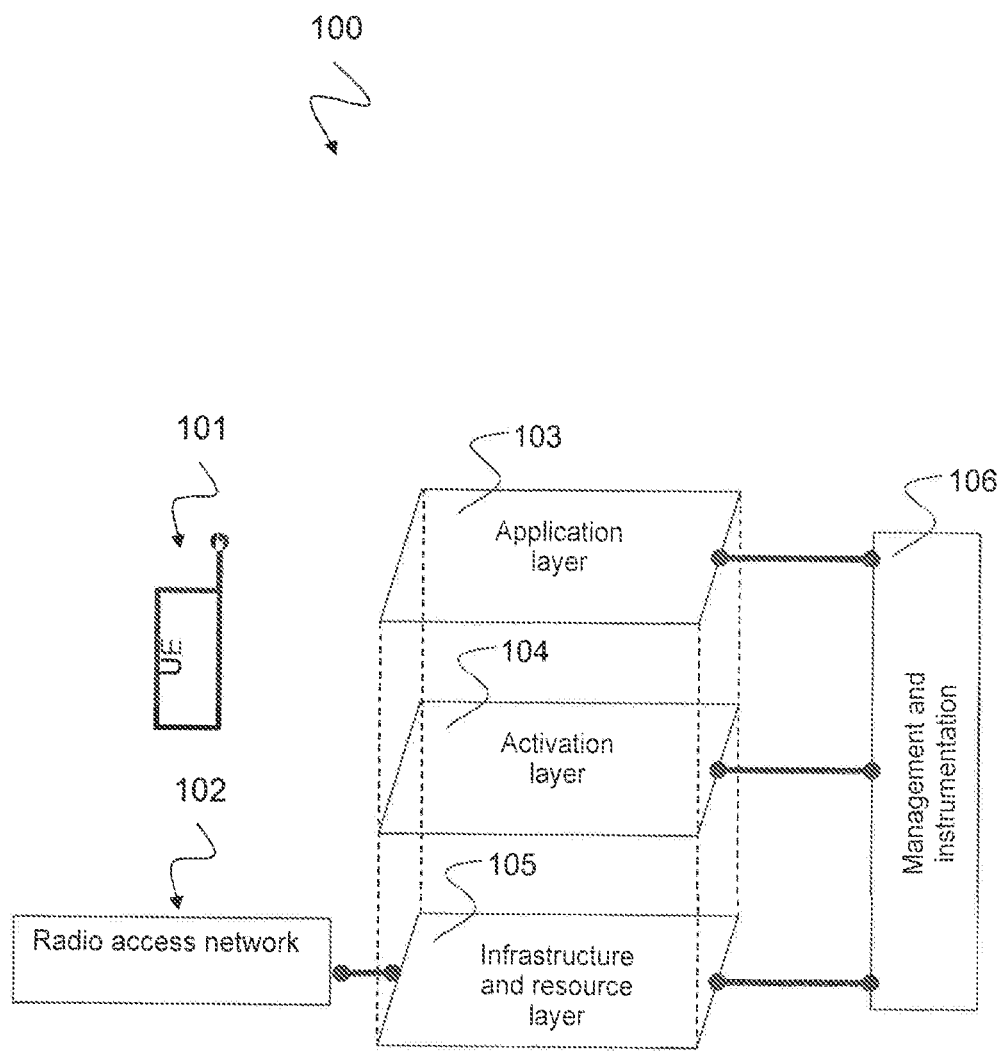
FIG. 1 shows an example of a 5G system architecture.

Exemplary embodiments of the present invention provide an efficient Quality of Service concept in a communication network comprising heterogeneous subnetworks which can be achieved via radio access technologies.

According to exemplary embodiments of the present invention, heterogeneous subnetworks of a communication network, for example slices of a 5G communication network, can be assigned Quality of Service classes which apply to the respective subnetwork per se. These Quality of Service classes are assigned to subnetworks of the communication network. The subnetworks are provided for example for different services and therefore conduct service-specific data streams with Quality of Service classes which are provided according to Service Level Agreements. Therefore, different Quality of Service classes can be assigned to different subnetworks of the same communication network. In addition, within a subnetwork, different Quality of Service classes can be provided or agreed for different data streams. The Quality of Service classes may define, for example, the minimum requirements to be met in terms of Quality of Service, for example for 95% of the transmission time. Therefore, even data streams with higher Quality of Service classes than the at least agreed Quality of Service class for the respective subnetwork can be conducted via the subnetworks. In general, the respective subnetwork can conduct a plurality of data streams with one or different Quality of Service classes, wherein the Quality of Service class agreed for the respective subnetwork is the lowest Quality of Service class. As the Quality of Service class increases, so too does the Quality of Service. The Quality of Service classes may differ for example in terms of data rate, bandwidth, latency, bit error rate or block error rate.

To comply with the Quality of Service classes in the subnetworks, for example, the allocation of the radio access resources of the Radio Access Technologies (RATs), such as for example time and/or frequency resources in for example an orthogonal frequency-division multiple access (OFMDA) system, is controlled. In this case, additional radio access resources can be made available to a subnetwork, for example a slice, by a radio access entity such as a base station in order to guarantee the Quality of Service class assigned to the subnetwork.

If the radio access technologies differ from one another, the appropriate radio access technology can be used or selected in each case for the data traffic in question. In addition, a handover of a communication link from one radio access entity to another radio access entity may take place in order to utilize the available communication resources more efficiently.

The radio access entities may therefore in general implement different radio access technologies. Furthermore, a radio access entity may be provided for radio access to precisely one subnetwork or to a plurality of subnetworks.

According to a first aspect, the invention relates to a method for controlling radio access resources in a communication network, wherein the communication network comprises a plurality of subnetworks including a first subnetwork and a subnetwork, wherein each subnetwork is assigned at least one predefined Quality of Service class according to at least one Service Level Agreement, wherein the Quality of Service classes of the subnetworks are managed by a central Quality of Service manager, wherein the communication network further comprises a radio access network with a plurality of radio access entities for radio access to at least one subnetwork of the plurality of subnetworks, which method comprises: transmission of information relating to a Quality of Service class of the first subnetwork by the central Quality of Service manager to a first radio access entity for radio access to the first subnetwork or to the second subnetwork. In response to receiving the information, the first radio access entity can autonomously allocate the radio access resources for the communication link using the first subnetwork or the second subnetwork.

According to an exemplary embodiment, the Quality of Service class agreed for a subnetwork can be understood as the minimum Quality of Service class with which one or more data traffic flows are conducted.

A subnetwork may also support other Quality of Service classes which have higher Qualities of Service than the Quality of Service of the respectively agreed Quality of Service class. The central Quality of Service manager may therefore also send information relating to higher Quality of Service classes to the radio access entities if a data traffic flow should require a Quality of Service class that is higher than the one agreed.

According to an exemplary embodiment, the method comprises transmission of a resource message by the first radio access entity to the central Quality of Service manager, wherein the resource message indicates the availability of radio access resources of the first radio access entity for a communication link of the first subnetwork with the agreed Quality of Service class. The Quality of Service manager can thereby be informed about the radio access resources of the distributed radio access entities.

According to an exemplary embodiment, the subnetworks may each also support different Qualities of Service which are assigned to data streams or users. The central Quality of Service manager may therefore transmit information relating to said Qualities of Service to one or more radio access entities.

According to an exemplary embodiment, the radio access entities allocate to the data streams and/or subnetworks those communication resources which are required for compliance with the respective Quality of Service class. To this end, the radio access entities may each have a database or a look-up table in which the radio access resources and/or the processing resources are assigned to the Quality of Service classes. However, the radio access entities may determine the radio access resources based on the information relating to the Quality of Service classes. To this end, optimization programs may be executed for example, which determine the radio access resources for the respective Quality of Service classes.

According to an exemplary embodiment, one or more Quality of Service classes may be agreed for a subnetwork and assigned to the respective subnetwork. The Quality of Service classes may for example specify different Quality of Service qualities for different data streams or services, such as for example best-effort service with a lower Quality of Service or ultra-reliable communication with a higher Quality of Service.

The information relating to the Quality of Service class may specify the respective Quality of Service class. The information may for example contain a QoS identifier, which indicates a Quality of Service (QoS).

The subnetworks may provide different services. For instance, a first subnetwork may be an LTE subnetwork with one Quality of Service class, another subnetwork may be an mMTC (Massive Machine Type Communications) subnetwork with one or more Quality of Service classes, and another subnetwork may be a Car-to-X subnetwork which supports two Quality of Service classes, such as for example best effort or ultra-reliable communication.

According to an exemplary embodiment, the first radio access entity allocates the radio access resources of the first radio access entity for the communication link as a function of the transmitted information relating to the Quality of Service class of the first subnetwork. This may happen, for example, if the resource message indicates that the radio access resources of the first radio access entity are available.

According to an exemplary embodiment, the radio access entities decide autonomously about the radio access resources to be distributed. To this end, the radio access entities may have resource managers which control or allocate the radio access resources of the respective radio access entity. This may take place for example on the basis of a look-up table in which different radio access resources are assigned to different Quality of Service classes.

According to an exemplary embodiment, the central Quality of Service manager initiates a handover of the communication link of the first subnetwork from the first radio access entity to a second radio access entity of the plurality of radio access entities. The initiation may take place according to an optimization parameter.

The optimization parameter may for example indicate the radio access technology that is more suitable than another technology for a particular service or data stream.

The optimization parameter may furthermore be at least one of the following optimization parameters: availability of radio access resources of the radio access entities for the respective communication link with the respective Quality of Service class, load balancing among the radio access entities, selection of a radio access entity with the lowest radio access resources that comply with the respective Quality of Service class, selection of a radio access unit for additionally complying with Quality of Service requirements on a data stream, service and/or user.

According to an exemplary embodiment, the central Quality of Service manager selects a radio access entity for a communication link according to an optimization parameter. The optimization parameter may be the aforementioned optimization parameter.

According to an exemplary embodiment, a Service Level Agreement is concluded for each Quality of Service class.

According to an exemplary embodiment, the Quality of Service classes correspond to the QCI (QoS Class Identifier) classes, for example of an LTE communication system.

According to an exemplary embodiment, the central Quality of Service manager initiates the handover of the communication link if the resource message indicates that the radio access resources of the first radio access entity are not available for the communication link with the first Quality of Service class, wherein the first radio access entity commences the handover of the communication link of the first subnetwork to the second radio access entity, or wherein the communication link of the first subnetwork takes place via the first radio access entity if the radio access resources of the first radio access entity are sufficient for the first Quality of Service class.

According to an exemplary embodiment, the method comprises the following steps if the resource message indicates that the radio access resources of the first radio access entity are insufficient for the communication link with the first Quality of Service class: transmission of the information relating to the first Quality of Service class of the first subnetwork by the central Quality of Service manager to the second radio access entity for radio access to the first subnetwork; receipt of a resource message from the second radio access entity, in particular from a resource manager of the second radio access entity; and commencement of the handover of the communication link of the first subnetwork from the first radio access entity to the second radio access entity if the resource message from the second radio access entity indicates that radio access resources are available for compliance with the first Quality of Service class for the communication link of the first subnetwork.

According to an exemplary embodiment, the functions of the subnetworks are predefined by a network orchestrator, wherein the central Quality of Service manager sends a message to the network orchestrator if it is not possible to comply with a Service Level Agreement. In response to this, the network orchestrator may select an alternative route for a communication link or may reconfigure the communication network. The network orchestrator may also allocate further functions to a subnetwork in order to comply with the Quality of Service class according to the relevant Service Level Agreement.

According to an exemplary embodiment, the communication link of the first subnetwork is conducted via the first radio access entity if the radio access resources of the first radio access entity are sufficient for the first Quality of Service class.

According to an exemplary embodiment, each radio access entity comprises a resource controller for controlling radio access resources of the respective radio access entity, and wherein the resource controller of the respective radio access entity allocates radio access resources of the first radio access entity to the respective subnetwork in order to support the respective Quality of Service class.

According to an exemplary embodiment, the radio access resources comprise at least one of the following radio access resources: bandwidth, frequency spectrum, time resources, number of transmission frames, number of time slots, transmission power, timing of time slots, timing of transmission frames.

According to an exemplary embodiment, the respective Quality of Service class comprises at least one of the following parameters: bandwidth, data rate, bit rate, bit error rate, block error rate, transmission delay.

According to an exemplary embodiment, the radio access units are base stations or routers, in particular wireless routers.

According to an exemplary embodiment, the radio access units are configured for different radio access technologies, in particular LTE, wireless local area network (WLAN), Universal Mobile Telecommunications System (UMTS), Global System for Mobile communications (GSM), 5G, and communication technologies for Machine Type Communication (MTC).

According to an exemplary embodiment, the central Quality of Service manager has a database containing Quality of Service classes for the subnetworks.

According to an exemplary embodiment, the communication network is a communication network of at least fifth generation (5G), and wherein the subnetworks are network slices.

According to an exemplary embodiment, the subnetworks are isolated from one another with regard to communication or data.

According to a second aspect, the invention relates to a central Quality of Service manager for controlling radio access resources in a communication network as a function of Quality of Service classes of subnetworks of the communication network, wherein each subnetwork is assigned at least one predefined Quality of Service class according to at least one Service Level Agreement, wherein the communication network further comprises a radio access network with a plurality of radio access entities for radio access to the plurality of subnetworks, said central Quality of Service manager comprising: a memory in which information relating to Quality of Service classes of the subnetworks is stored; a processor which is designed to read from the memory information relating to a Quality of Service class of the first subnetwork; and a communication interface for sending information relating to a first Quality of Service class of a first subnetwork of the communication network to a first radio access entity for radio access to the first subnetwork.

According to an exemplary embodiment, the communication interface is designed to receive a resource message from the first radio access entity, wherein the resource message indicates the availability of radio access resources of the first radio access entity for a communication link of the first subnetwork with the agreed Quality of Service class; wherein the processor is designed to conduct the communication link of the first subnetwork via the first radio access entity if the resource message indicates that radio access resources are available for the communication with the first Quality of Service class, or to commence a handover of the communication link to a second radio access entity of a second subnetwork of the plurality of subnetworks if the resource message indicates that the radio access resources of the first radio access entity are insufficient for the communication link with the first Quality of Service class.

The central Quality of Service manager may be provided for carrying out the method according to the first aspect. The central Quality of Service manager may have the features of the central Quality of Service manager described in connection with the first aspect.

The methods and systems presented below may be of various types. The individual elements described may be realized by hardware or software components, for example electronic components which can be manufactured by various technologies and which include for example semiconductor chips, application-specific integrated circuits (ASICs), microprocessors, digital signal processors, integrated electrical circuits, electro-optical circuits and/or passive components.

The devices, systems and methods presented below are suitable for transmitting information over a communication network. The term communication network refers to the technical infrastructure on which the transmission of signals takes place. The communication network comprises the carrier network in which signals are transmitted and carried between the stationary devices and platforms of the mobile network or fixed network, as well as the radio access network in which signals are transmitted between a network access device and the communication terminal. The communication network may in this case comprise both components of a mobile network and components of a fixed network. In the mobile network, the radio access network is also referred to as an air interface and includes for example a base station (NodeB, eNodeB, radio cell) with a mobile radio antenna for establishing communication with a communication terminal, such as a mobile telephone or smartphone or a mobile device having a mobile radio adapter. In the fixed network, the radio access network comprises for example a DSLAM (Digital Subscriber Line Access Multiplexer) for connecting the communication terminals of multiple subscribers in a wired or cabled manner. Beyond the carrier network, the communication may be carried onward in further networks, for example of other network operators, for example foreign networks.

The devices, systems and methods presented below are intended to increase communication in communication networks, in particular in communication networks according to the 5G system architecture presented below. FIG. 1 shows a schematic diagram of such a 5G system architecture 100. The 5G system architecture 100 comprises an area with 5G communication terminals 101 which are connected via different access technologies 102 to a multi-layered communication structure that comprises an infrastructure and resource layer 105, an activation layer 104, and an application layer 103, said layers being managed via a management and instrumentation level 106.

The infrastructure and resource layer 105 comprises the physical resources of a convergent network structure consisting of fixed network components and mobile network components (so-called fixed-mobile convergence) with access nodes, cloud nodes (processing and storage nodes), 5G devices such as mobile telephones, portable devices, customer-premises equipments (CPEs), machine communication modules and others, network nodes and associated links. 5G devices may comprise varied and configurable capabilities and may act for example as a relay or hub or operate as a computer/storage resource, depending on the respective context. These resources are made available to the higher layers 104, 103 and to the management and instrumentation level 106 via suitable APIs (Application Program Interfaces). The monitoring of performance and configurations is an inherent part of such APIs.

The activation layer 104 comprises a library of functions that are needed within a converged network in the form of building blocks of a modular architecture. These include functions realized by software modules that can be retrieved from a repository of the desired location, and a set of configuration parameters for particular parts of the network, for example radio access. These functions and capabilities can be called up on request by the management and instrumentation level 106 by using the APIs provided for this purpose. For certain functions, multiple variants may exist, for example different implementations of the same functionality which have different performance or characteristics. The different levels of performance and capabilities offered can be used to differentiate the network functionalities much more than is possible in current networks, for example to offer as the mobility function a nomadic mobility, a vehicle mobility or an aeromobility depending on the specific needs.

The application layer 103 comprises specific applications and services of the network operator, of the enterprise, of the vertical operator, or of third parties using the 5G network. The interface to the management and instrumentation level 106 makes it possible for example to construct particular, that is to say dedicated, network slices (or subnetworks) for an application, or to allocate an application to an existing network slice.

The management and instrumentation level 106 is the contact point for transforming the required use cases into actual network functions and slices. It defines the network slices for a given use scenario, concatenates the relevant modular network functions, assigns the relevant performance configurations, and maps everything onto the resources of the infrastructure and resource layer 105. The management and instrumentation level 106 also manages the scaling of the capacity of these functions, as well as the geographical distribution thereof. In particular use cases, it may also have capabilities which enable third parties to create and manage their own network slices by using the APIs. Due to the varied tasks of the management and instrumentation level 106, the latter is not a monolithic block of functionality, but rather a collection of modular functions that integrate advances made in various network domains, such as for example NFV (Network Function Virtualization), SDN (Software-Defined Networking) or SON (Self-Organizing Networks). The management and instrumentation level 106 uses data-aided intelligence to optimize all aspects of service design and provisioning.

The devices, systems and methods presented here are intended to improve communication in communication networks, in particular in 5G communication networks comprising a plurality of network slices, as described below.

Figure 2:
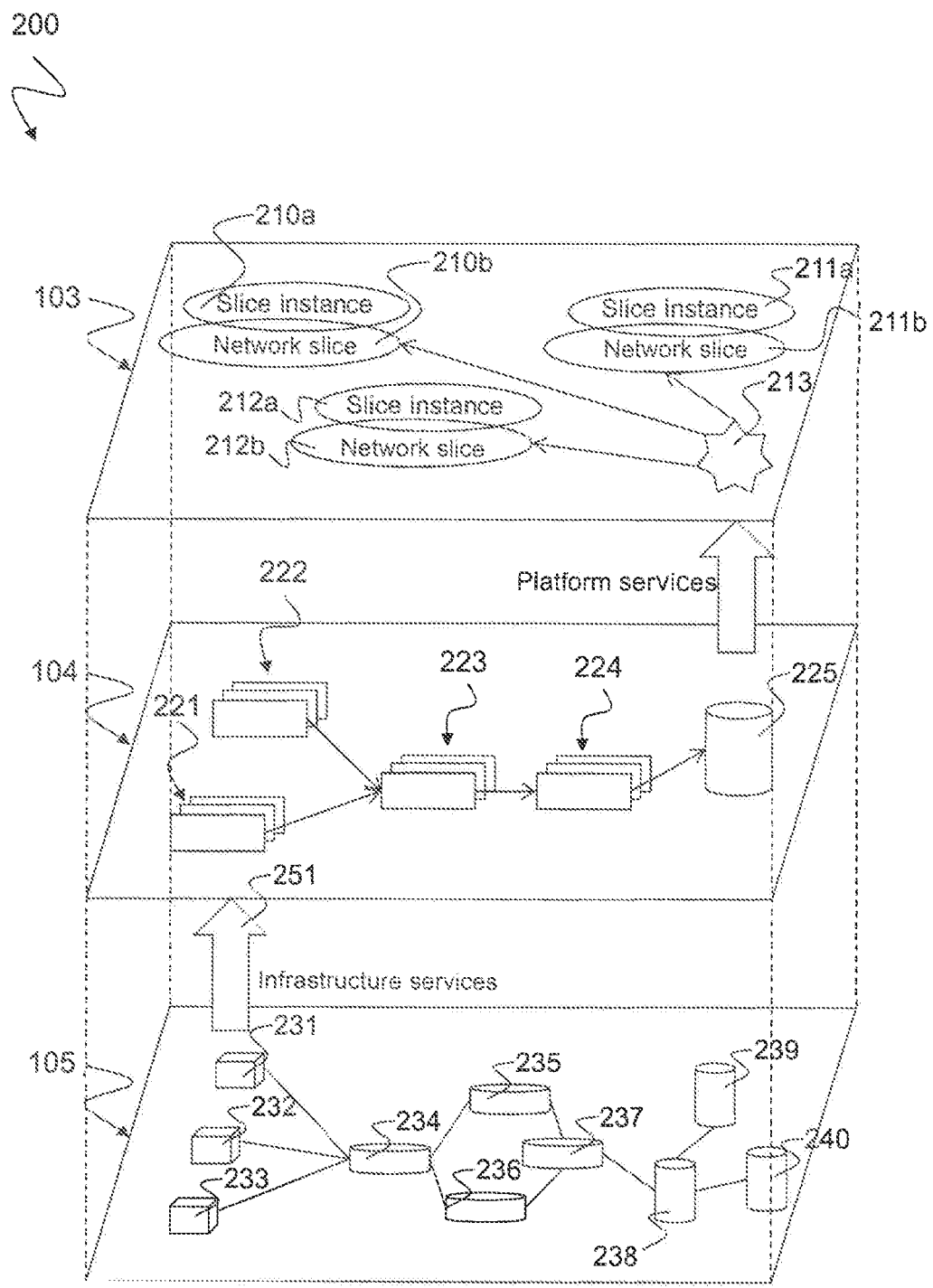
FIG. 2 shows a schematic diagram of a 5G communication network.

FIG. 2 shows a schematic diagram of a 5G communication network 200 comprising a plurality of network slices. The 5G communication network 200 comprises an infrastructure and resource layer 105, an activation layer 104, and an application layer 103.

The infrastructure and resource layer 105 comprises all the physical assets associated with a network operator, that is to say sites, cables, network nodes, etc. This layer 105 forms the basis for all network slices. It is constructed as generically as possible, without too many specialized physical units. The infrastructure and resource layer 105 conceals from the upper layers any type of user-specific implementation, so that the remaining systems can be used for different slices in the best possible way. Components of the infrastructure and resource layer 105 are based on hardware and software and/or firmware that is required for the respective operation and that is made available as resource objects to the layers located above the infrastructure and resource layer 105. For example, objects of the infrastructure and resource layer 105 include virtual machines, virtual links or connections and virtual networks, for example virtual access nodes 231, 232, 233, virtual network nodes 234, 235, 236, 237 and virtual computer nodes 238, 239, 240. As the term "virtual" already implies, the infrastructure and resource layer 105 makes the objects available to the next-higher layer 104 in the form of an "infrastructure as a service" 251, that is to say in an abstracting, virtualized form.

The activation layer 104 is arranged above the infrastructure and resource layer 105. It uses the objects of the infrastructure and resource layer 105 and adds additional functionality thereto in the form of software objects/VNFs so as to make it possible to create any type of network slices and thus provide a platform as a service to the next-higher layer 103.

Software objects can exist in any granularity, and may comprise a tiny or a very large fragment of a network slice. To make it possible to create network slices at an appropriate level of abstraction, various abstracted objects 221 can be combined with other abstracted objects and with virtual network functions 222 in the activation layer 104 in order to form combined objects 223 which can be transformed into aggregated objects 224 and can be made available to the next-higher level in an object library 225. The complexity behind the network slices can thus be hidden. For example, a user may create a mobile broadband slice, defining only KPIs (Key Performance Indicators), without having to specify specific features such as individual local antenna coverage, backhaul connections and specific parameterization levels. To support an open environment and to make it possible to add or delete network functions on demand, one important capability of the activation layer 104 is that it supports the dynamic reordering of functions and connectivities in a network slice, for example by using SFC (Service Function Chaining) or modifying software so that the functionality of a slice can be completely predefined and can include both approximately static software modules and dynamically addable software modules.

A network slice can be considered as a software-defined entity based on a set of objects that define a complete network. The activation layer 104 plays a key role in the success of this concept since it may includes all the software objects that are necessary in order to provide the network slices and the appropriate skills to handle the objects. The activation layer 104 may be regarded as a type of network operating system complemented by a network creation environment. One task of the activation layer 104 is that of defining the appropriate levels of abstraction. Network operators thus have sufficient freedom to design their network slices while the platform operator can still maintain and optimize the physical nodes. For example, the execution of everyday tasks such as adding or replacing NodeBs, etc. is supported without the intervention of network customers. One of the main tasks of the activation layer 104 when developing the network slices environment is that of defining suitable objects that model a complete telecommunications network.

A network slice, also referred to as a 5G slice, supports the communication services of a particular type of connection with a particular type of handling of the C (Control) and U (User Data) layer. A 5G slice is composed of a collection of different 5G network functions and specific Radio Access Technology (RAT) settings, which are combined together to benefit the specific use case. Therefore, a 5G slice can span all domains of the network, for example software modules running on cloud nodes, specific configurations of the transport network that support flexible location of the functions, a particular radio configuration or even a particular access technology, just as well as a configuration of the 5G devices. Not all slices contain the same functions; some features that today seem essential for a mobile network may not even exist in some slices. The intention of the 5G slice is to provide only those functions that are necessary for the specific use case and to avoid all other unnecessary functionalities. The flexibility behind the slice concept is the key both to expanding existing use cases and to creating new use cases. Third party devices may be granted permission to control certain aspects of slicing via suitable APIs, in order thus to provide tailored services.

The application layer 103 comprises all the created network slices 210b, 211b, 212b and offers these as a "network as a service" to different network users, for example different customers. The concept makes it possible to reuse defined network slices 210b, 211b, 212b for different users, for example customers, for example as a new network slice instance 210a, 211a, 212a. In other words, a network slice 210b, 211b, 212b that is assigned for example to an automotive application can also be used for applications in various other industrial uses. The slice instances 210a, 211a, 212a created by a first user may for example be independent of the slice instances created by a second user, even though the overall network slice functionality may be the same.

The slices 210b, 211b, 212b form exemplary embodiments of subnetworks of a communication network.

Figure 3:
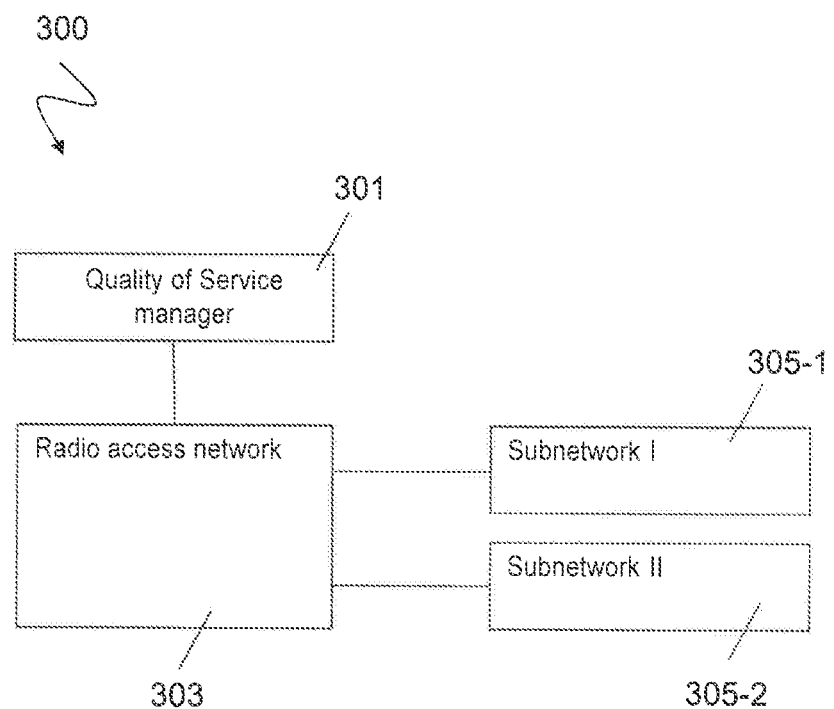
FIG. 3 shows a communication network.

FIG. 3 shows a communication system 300 comprising a plurality of subnetworks 305 including a first subnetwork 305-1 and a subnetwork 305-2, wherein each subnetwork 305 is assigned a predefined Quality of Service class according to a Service Level Agreement, wherein the Quality of Service classes of the subnetworks 305-1, 305-2 are managed by a central Quality of Service manager 301, wherein the communication network further comprises a radio access network 303 with a plurality of radio access entities (not shown in FIG. 3), for example base stations, for radio access to the plurality of subnetworks 305.

The Quality of Service classes specify Qualities of Service (QoS) for the subnetworks 305-1, 305-2. The Quality of Service classes may specify or indicate for example a data rate, a latency, a bit error rate or block error rate, frequencies and/or resources such as bandwidth or time slots. The Quality of Service classes may be defined according to a Service Level Agreement (SLA) for the subnetworks 305 and for the data streams of the subnetworks 305.

According to an exemplary embodiment, the Quality of Service classes of the subnetworks 305 are user-independent. However, the subnetworks 305 may additionally take account of user-dependent service classes.

The central Quality of Service manager 301 is assigned for example to the management and instrumentation level 106 and manages the Quality of Service classes of the subnetworks 305.

The Radio Access Network 303 (RAN) is provided for radio access to the subnetworks 305. The radio access network 303 may for example include base stations, antennas, routers, and other RAN components.

Figure 4:
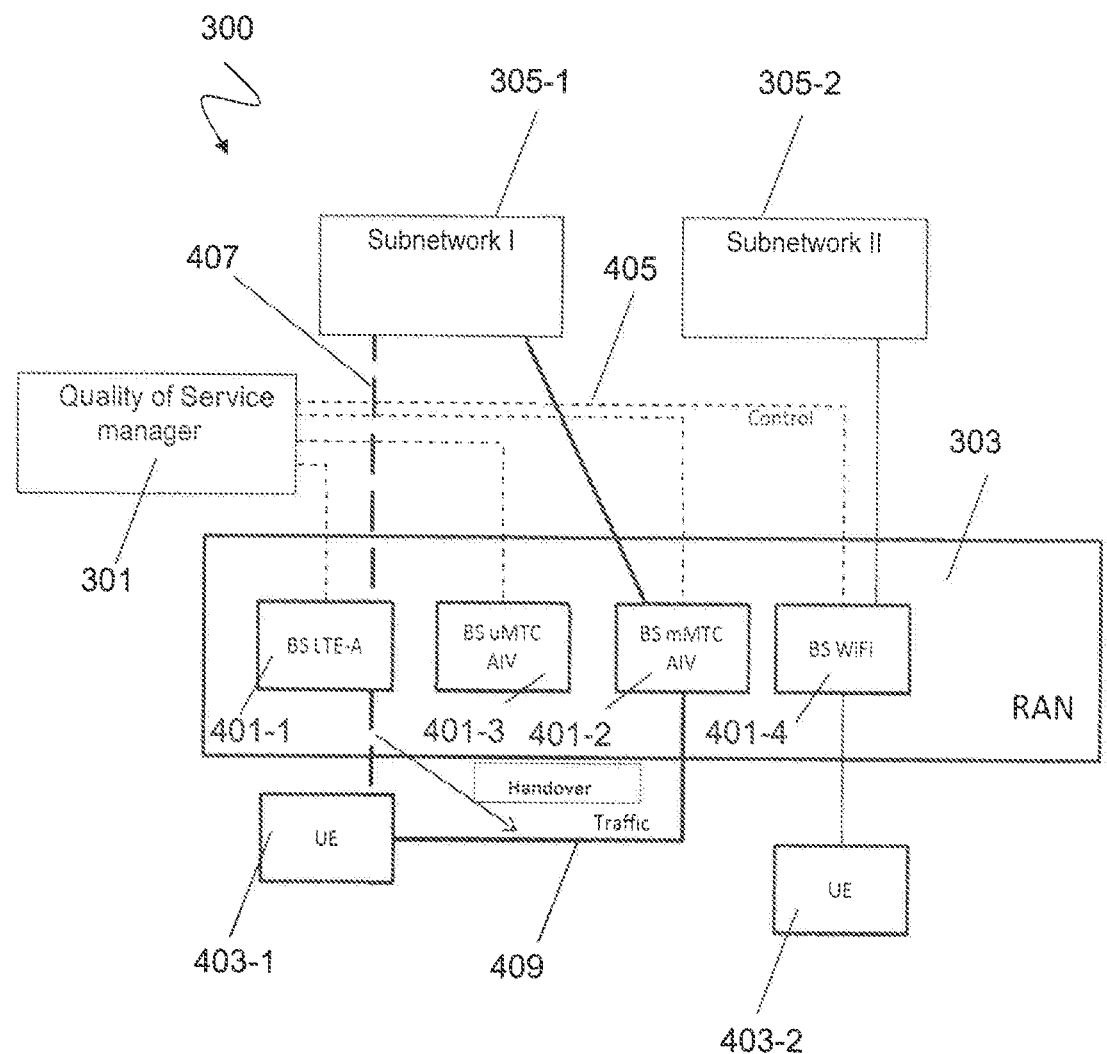
FIG. 4 shows a communication network.

The resource controller will be described with reference to the communication network 300 shown in FIG. 4 according to an exemplary embodiment.

The radio access network 303 may include for example a plurality of base stations, for example the base stations 401-1 to 401-4, which may be assigned different Radio Access Technologies (RATs), such as for example LTE, WLAN, WiFi, UMTS, GSM, and radio access technologies for Machine-Type Communication (MTC). In this way, mobile terminals (UE) 403-1, 403-2 can communicate via the subnetworks 305-1, 305-2. However, more or fewer base stations may be arranged in the radio access network 303. The exemplary embodiments therefore relate at least to one base station.

The Quality of Service manager 301 has for example a database containing Quality of Service classes for the subnetworks 305-1, 305-3, said classes defining the Qualities of Service (QoS) that are defined for the subnetworks 305-1, 305-3. In the case of 5G networks, the Qualities of Service are known to the management and instrumentation level 106 or to an orchestrator that defines the subnetworks 305-1, 305-3 as an element of the core network 503. As an alternative or in addition, the Quality of Service manager 301 may obtain the Quality of Service classes from a higher-level entity such as the aforementioned orchestrator or from the subnetworks 305-1, 305-3 themselves.

In order to adapt radio access resources to the Qualities of Service, the Quality of Service manager 301 transmits for example information relating to a first Quality of Service class of the first subnetwork 305-1 to a first radio access entity 401-1 for radio access to the first subnetwork 305-1. The first radio access entity 401-1 may transmit a resource message to the central Quality of Service manager 301, wherein the resource message indicates the availability of radio access resources of the first radio access entity 401-1 for a communication link of the first subnetwork 305-1 with the agreed Quality of Service class. The information may be a QoS identifier.

According to an exemplary embodiment, the resource message forms a confirmation which the respective radio access entity 401 sends to the Quality of Service manager in response to receiving the information relating to the respective Quality of Service class.

The radio access entities 401 autonomously allocate their own radio access resources to the communication links or data streams according to the required Quality of Service classes.

If the first radio access entity 401-1 has sufficient resources, for example communication resources, then the communication link 407 is established or maintained.

To this end, the radio access entities 401-1 to 401-4 may have resource managers which allocate the resources of the radio access entities, such as bandwidth and transmission power, to the respective subnetwork 305-1, 305-2 (scheduling).

However, if the resource message indicates that the radio access entity 401-1 does not have sufficient resources to comply with the required Quality of Service class for the first subnetwork 305-1, then the central Quality of Service manager 301 may select a second radio access entity and initiate a handover of the communication link or of a data stream to the further radio access entity 401, for example to the radio access entity 401-2.

Before the handover of the communication link is commenced in the manner described above, the second radio access entity 401-2 may likewise transmit a resource signal to the central Quality of Service manager 301. If the resource signal indicates that the second radio access entity 401-3 has sufficient resources to comply with the Quality of Service class for the first subnetwork 305-1, then the communication link 409 is conducted via the second radio access entity 401-2. Different radio access technologies can also be used here.

According to an exemplary embodiment, the resource management in the management and instrumentation level 106, in particular the central Quality of Service manager 301, has knowledge of the SLAs for the subnetworks 305-1, 305-2, for example network slices, in which the Quality of Service requirements of data streams assigned to the subnetworks 305-1, 305-2, and possibly the radio channel properties in the radio access network. Based on this information, the central Quality of Service manager 301 can decide which data stream is to be transmitted via which base station and radio access technology (data stream control). If, for example, not all QoS requirements can be met, the central Quality of Service manager 301 may decide to conduct the respective data stream via the radio access technology and/or radio access entity that guarantees a next-lower Quality of Service class. This prevents severe degradation of the Quality of Service.

The Quality of Service class may for example specify that a subnetwork must be guaranteed 10 Mbps for 95% of the communication time.

According to an exemplary embodiment, the Quality of Service manager 301 informs the radio access network 303 (RAN), for example base stations or routers, about the SLAs or Quality of Service agreements (QoS agreements) relating to the subnetworks 305, for example slices.

In the radio access network 303, the resources are controlled or distributed autonomously in response to this information, for example by the schedulers of the radio access entities 401.

The resource control may for example consist in that for example more bandwidth or more communication resources are allocated to the subnetwork that has a higher Quality of Service class according to a Service Level Agreement, such as for example more bandwidth or more time frames.

The resource control is carried out autonomously in the resource managers, for example schedulers, of the radio access entities, for example base stations.

According to an exemplary embodiment, the base stations inform the Quality of Service manager 301 about the data stream, for example about the error rate, the data rate, etc. Furthermore, the radio access entities may inform the Quality of Service manager 301 as to whether QoS criteria can or cannot be met.

Figure 5:
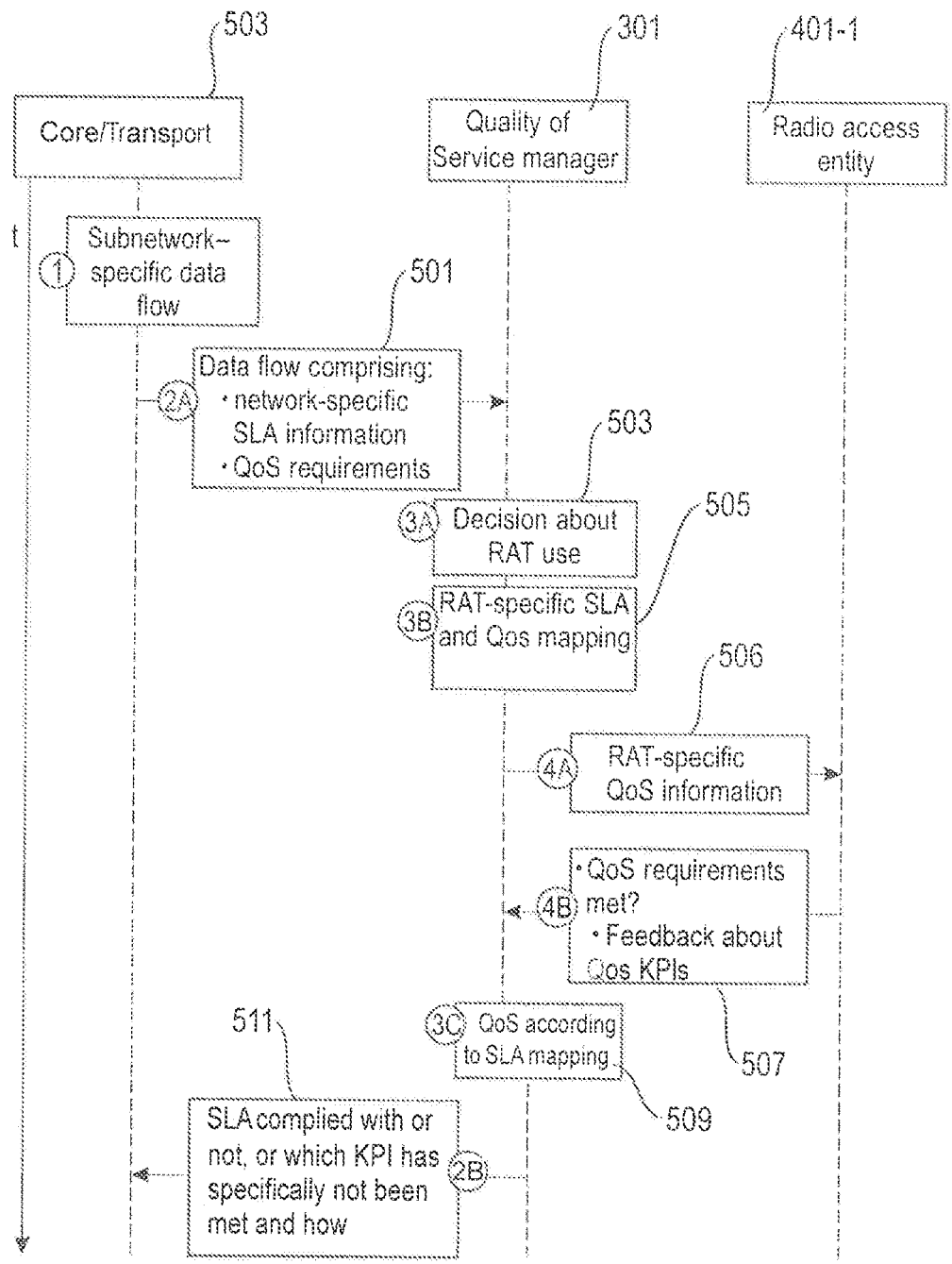
FIG. 5 shows a flowchart of a method for controlling radio access resources.

FIG. 5 shows an exemplary flowchart of a method for controlling radio access resources, based on the example of the first subnetwork 305-1 and the radio access entity 401-1 with a subnetwork-specific data flow. The subnetwork 305-1 may be provided for example in the core network for data transport.

The orchestrator, which is part of the core network 503, is responsible for assembling the communication network and informs the Quality of Service manager 301 about the subnetworks 305 that exist and about the SLAs that apply.

In step 501, a network entity of the core network 503, for example the orchestrator or a router, transmits to the Quality of Service manager 301 the Quality of Service requirements and optionally also information relating to the first subnetwork 305-1 by way of SLAs for an occurring data stream. This information may be transmitted for example in layer 2 or layer 3 of the IP protocol, such as IPv4 or IPv6, in the header as header information.

In step 502, the Quality of Service manager 301 can decide which radio access technology, such as LTE or WLAN, is to be used for a specific data stream. In step 505, the Quality of Service manager 301 carries out a mapping of Quality of Service or SLA requirements radio access in order to obtain information about a Quality of Service class. The information relating to the Quality of Service class may be radio access technology-specific and may include for example information relating to bandwidth, latency or data rate.

In step 506, the information relating to the Quality of Service class is transmitted to a radio access entity, for example to the radio access entity 401-1.

In step 507, the first radio access entity 401-1 transmits a resource message to the Quality of Service manager 301, wherein the resource message indicates for example the availability of radio access resources of the first radio access entity 401-1 for a communication link of the first subnetwork 305-1 with the agreed Quality of Service class. In addition, feedback may take place in relation to the KPIs, such as for example throughput, latency, bit error rate or block error rate. The resource message may additionally contain information as to whether the data stream can be or has been able to be successfully transmitted with the required QoS.

To this end, the first radio access entity 401-1 may have a resource manager, for example a scheduler, which allocates the communication resources, such as frequency/time resources, to the first subnetwork 305-1 in order to achieve the required Quality of Service class.

In step 509, the Quality of Service manager 301 can map the achieved Quality of Service class onto the Service Level Agreement (SLA), and in step 511 can send a message to the network entity of the core network 503 indicating whether the SLA has or has not been complied with or indicating which KPI, such as data rate for example, has not been achieved and how large a discrepancy there is from the requirement according to the requested Quality of Service classes.

Figure 6:
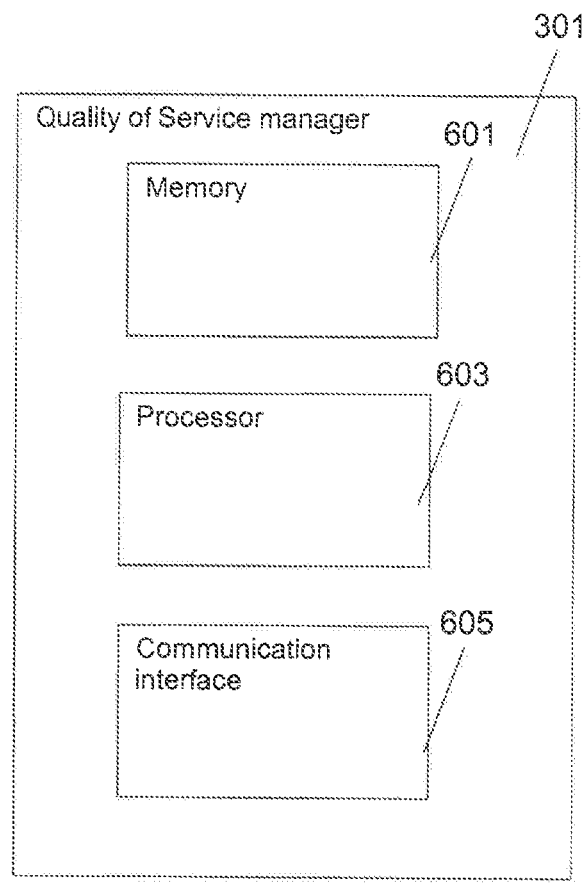
FIG. 6 shows a schematic block diagram of a central Quality of Service manager.

FIG. 6 shows a schematic block diagram of the central Quality of Service manager 301 for controlling radio access resources in the communication network 300 as a function of Quality of Service classes of subnetworks 305 of the communication network 300, wherein each subnetwork 305 is assigned a predefined Quality of Service class according to a Service Level Agreement (SLA), wherein the communication network 300 further comprises a radio access network 303 with a plurality of radio access entities 401 for radio access to the plurality of subnetworks 305. The central Quality of Service manager 301 has a memory 601 in which information relating to Quality of Service classes of the subnetworks is stored, a communication interface 605 for sending information relating to a first Quality of Service class of a first subnetwork 305-1 of the communication network 300 to a first radio access entity 401-1 for radio access to the first subnetwork 305-1, wherein the communication interface 605 is designed to receive a resource message from the first radio access entity 401-1, wherein the resource message indicates the availability of radio access resources of the first radio access entity 401-1 for a communication link of the first subnetwork 305-1 with the agreed Quality of Service class. The communication interface 605 may be a wireless or wired communication interface.

The Quality of Service manager 301 further comprises a processor 603 which is designed to conduct the communication link of the first subnetwork 305-1 via the first radio access entity 401-1 if the resource message indicates for example that radio access resources are available for the communication with the first Quality of Service class.

However, the processor 301 may be designed to commence handover of the communication link to a second radio access entity 401-2 of a second subnetwork 305-2 of the plurality of subnetworks 305. This handover may for example on the basis of the aforementioned optimization parameter, or if the resource message indicates that the radio access resources of the first radio access entity 401-1 are insufficient for the communication link with the first Quality of Service class.

The radio access entities 401 may provide the radio access resources for example by allocating more or less bandwidth or more or fewer time slots to a subnetwork 305 and/or to a data stream.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling radio access resources in a communication network, comprising:
   managing, by a central quality of service manager, quality of service classes of a plurality of subnetworks of the communication network, wherein the plurality of subnetworks are logically separate from one another, and wherein each subnetwork of the plurality of subnetworks has an assigned quality of service class according to at least one quality of service agreement for communication services;
   transmitting, by the central quality of service manager to a first radio access entity of a plurality of radio access entities of a radio access network of the communication network, information relating to a quality of service class of a first subnetwork of the plurality of subnetworks;
   receiving, by the central quality of service manager, a first resource message from the first radio access entity, wherein the first resource message indicates that available radio access resources of the first radio access entity are not adequate to comply with the quality of service class of the first subnetwork;
   in response to receiving the first resource message, transmitting, by the central quality of service manager to a second radio access entity of the plurality of radio access entities, information relating to the quality of service class of the first subnetwork;
   receiving, by the central quality of service manager, a second resource message from the second radio access entity, wherein the second resource message indicates that available radio access resources of the second radio access entity are adequate to comply with the quality of service class of the first subnetwork; and
   in response to receiving the second resource message, initiating, by the central quality of service manager, establishment of a communication connection between a mobile terminal and the first subnetwork via the second radio access entity, wherein the second radio access entity allocates radio access resources for the communication connection based on the quality of service class of the first subnetwork.

2. The method according to claim 1, wherein initiating establishment of the communication connection between the mobile terminal and the first subnetwork via the second radio access entity corresponds to initiating a handover of a communication link of the first subnetwork from the first radio access entity to the second radio access entity.

3. The method according to claim 2, wherein initiating the handover is based on at least one of the following:
availability of radio access resources and/or data processing resources of respective radio access entities;
load balancing among respective radio access entities;
selection of respective radio access entities with the lowest radio access resources that comply with respective quality of service classes; and/or
quality of service requirements for a data stream.

4. The method according to claim 1, wherein functions of the plurality of subnetworks are predefined by a network orchestrator, and wherein the central quality of service manager sends a message to the network orchestrator based on compliance with a quality of service agreement not being possible.

5. The method according to claim 1, wherein each respective radio access entity of the plurality of radio access entities comprises a resource controller for controlling radio access resources of the respective radio access entity, and wherein the resource controller of the respective radio access entity allocates radio access resources to a respective subnetwork in order to support a respective quality of service class.

6. The method according to claim 1, wherein the radio access resources comprise at least one of the following radio access resources: bandwidth, frequency spectrum, time resources, number of transmission frames, number of time slots, and/or transmission power.

7. The method according to claim 1, wherein a respective quality of service class comprises at least one of the following parameters: bandwidth, data rate, bit rate, bit error rate, block error rate, and/or transmission delay.

8. The method according to claim 1, wherein the plurality of radio access entities comprise base stations or wireless routers.

9. The method according to claim 1, wherein the plurality of radio access entities are configured for different radio access technologies and communication technologies for Machine Type Communication (MTC).

10. The method according to claim 1, wherein the communication network is a communication network of at least fifth generation, and wherein the plurality of subnetworks are network slices.

11. The method according to claim 1, wherein the plurality of subnetworks are isolated from one another with regard to communication.

12. A non-transitory computer-readable medium having processor-executable instructions stored thereon for controlling radio access resources in a communication network, wherein the processor-executable instructions, when executed, facilitate:
managing, by a central quality of service manager, quality of service classes of a plurality of subnetworks of the communication network, wherein the plurality of subnetworks are logically separate from one another, and wherein each subnetwork of the plurality of subnetworks has an assigned quality of service class according to at least one quality of service agreement for communication services;
transmitting, by the central quality of service manager to a first radio access entity of a plurality of radio access entities of a radio access network of the communication network, information relating to a quality of service class of a first subnetwork of the plurality of subnetworks;
receiving, by the central quality of service manager, a first resource message from the first radio access entity, wherein the first resource message indicates that available radio access resources of the first radio access entity are not adequate to comply with the quality of service class of the first subnetwork;
in response to receiving the first resource message, transmitting, by the central quality of service manager to a second radio access entity of the plurality of radio access entities, information relating to the quality of service class of the first subnetwork;
receiving, by the central quality of service manager, a second resource message from the second radio access entity, wherein the second resource message indicates that available radio access resources of the second radio access entity are adequate to comply with the quality of service class of the first subnetwork; and
in response to receiving the second resource message, initiating, by the central quality of service manager, establishment of a communication connection between a mobile terminal and the first subnetwork via the second radio access entity, wherein the second radio access entity allocates radio access resources for the communication connection based on the quality of service class of the first subnetwork.

13. A system for controlling radio access resources in a communication network, the system comprising:
a central quality of service manager configured to manage quality of service classes of a plurality of subnetworks of the communication network, wherein the plurality of subnetworks are logically separate from one another, and wherein each subnetwork of the plurality of subnetworks has an assigned quality of service class according to at least one quality of service agreement for communication services; and
a radio access network comprising a plurality of radio access entities;
wherein the central quality of service manager is further configured to transmit, to a first radio access entity of the plurality of radio access entities, information relating to a quality of service class of a first subnetwork of the plurality of subnetworks;
wherein the first radio access entity is configured to transmit, to the central quality of service manager, a first resource message, wherein the first resource message indicates that available radio access resources of the first radio access entity are not adequate to comply with the quality of service class of the first subnetwork;
wherein the central quality of service manager is further configured to transmit, to a second radio access entity of the plurality of radio access entities, in response to receiving the first resource message, information relating to the quality of service class of the first subnetwork;
wherein the second radio access entity is configured to transmit a second resource message from the second radio access entity, wherein the second resource message indicates that available radio access resources of the second radio access entity are adequate to comply with the quality of service class of the first subnetwork; and
wherein the central quality of service manager is further configured to initiate, in response to receiving the second resource message, establishment of a communication connection between a mobile terminal and the first subnetwork via the second radio access entity, wherein the second radio access entity allocates radio access resources for the communication connection based on the quality of service class of the first subnetwork.

* * * * *